(12) United States Patent
Chien et al.

(10) Patent No.: US 7,591,690 B1
(45) Date of Patent: Sep. 22, 2009

(54) CONNECTING DEVICE FOR SOLAR PANEL

(75) Inventors: Ying-Che Chien, Taoyuan (TW); Chen-Ting Fan, Taoyuan (TW)

(73) Assignee: Hong Tai Electric Industrial Co., Ltd., Taoyuan (TW)

( * ) Notice: Subject to any disclaimer, the term of this patent is extended or adjusted under 35 U.S.C. 154(b) by 0 days.

(21) Appl. No.: 12/188,059

(22) Filed: Aug. 7, 2008

(51) Int. Cl.
*H01R 9/22* (2006.01)
(52) U.S. Cl. .................................. 439/709; 439/842
(58) Field of Classification Search ............... 439/709, 439/842, 843
See application file for complete search history.

(56) References Cited

U.S. PATENT DOCUMENTS 7,097,516 B2 8/2006 Werner et al.

*Primary Examiner*—Tho D Ta
*Assistant Examiner*—Travis Chambers
(74) *Attorney, Agent, or Firm*—WPAT, P.C.; Anthony King; Kay Yang

(57) ABSTRACT

A connecting device for solar panel includes an enclosure; a plurality of connecting units arranged in the enclosure and each having a sleeve portion and an angled portion with clamping elements arranged on the angled portion; a plurality of holding-down members each having a curved pressing portion downward extending through an engaging hole to abut against an inner surface of the sleeve portion, and two wing portions outward extended from middle sections of two straight edges of the curved pressing portion for resting on an outer surface of the sleeve portion along the engaging hole; and a plurality of connectors provided on one side of the enclosure to connect to the clamping elements of the connecting units. Conductors extended from solar panels can be firmly clamped between the curved pressing portion and the inner surface of the sleeve portion to ensure good electric transmission performance of the connecting device.

4 Claims, 4 Drawing Sheets

A-A

CONNECTING DEVICE FOR SOLAR PANEL

FIELD OF THE INVENTION

The present invention relates to a connecting device for solar panel, and more particularly to a connecting device for solar panel that ensures firm and stable connection of external conductors from solar panels to connecting units in the connecting device and accordingly provides good electric transmission performance.

BACKGROUND OF THE INVENTION

U.S. Pat. No. 7,097,516 B2 discloses a connecting box for a solar panel comprising a housing having an opening for introducing contacts of the solar panel; contact elements provided in the housing for electrically connecting to the contacts of the solar panel, the contact elements having a tapered receiving region and a contact region extending from the tapered receiving region for automatic introduction of a contact of the solar panel via the receiving region into the contact region; and a base board for receiving the housing, the base board having an opening positioned along the opening of the housing, and the housing having a receiving space for insertion of the contact being laterally offset from a lid opening. The contact region has a front receiving region and a lower receiving region. In the front receiving region, there are two spring arms bent outwards, so that the front receiving region tapers in the direction of the contact region. The two spring arms are also arranged at an acute angle to one another in the lower receiving region, so that the lower receiving region tapers from the bottom. With these arrangements, a fixed contact at one end of a solar panel can be automatically inserted into the contact region from below and from the front and be clamped in place by the two spring arms.

In the connecting box for a solar panel disclosed in U.S. Pat. No. 7,097,516 B2, the fixed contact at one end of the solar panel is clamped in place by the two spring arms in the contact region. However, the two spring arms clamp the fixed contact only from left and right sides or upper and lower sides of the fixed contact. The clamping force can be applied by the two spring arms to the fixed contact at one end of the solar panel appears to be insufficient for firmly holding the fixed contact, and the two spring arms tend to deform at their bent areas after having been used for a period of time due to repeated insertion and extraction of the fixed contact into and from the two spring arms. Under this condition, a clearance between the spring arms is increased, and the spring arms would fail to firmly clamp on the fixed contact at one end of the solar panel to thereby largely adversely affect the electric transmission performance of the connecting box.

SUMMARY OF THE INVENTION

A primary object of the present invention is to provide a connecting device for solar panel, with which conductors extended from solar panels can be firmly clamped between curved pressing portions and inner surface of sleeve portions to ensure firm and stable contact of the conductors with connecting units of the connecting device and accordingly, good electric transmission performance of the connecting device.

To achieve the above and other objects, the connecting device for solar panel according to the present invention includes an enclosure having a plurality of holding members arranged side by side on an inner surface thereof, a support member being provided at one end of each of the holding members, and a locating member being connected to each of the support members, and each of the locating members being provided at predetermined positions with a through hole each; a plurality of connecting units each being formed at a first end into a sleeve portion for locating on the holding member, the sleeve portions each being formed on at least an end surface and a top surface with an opening and an engaging hole, respectively, a second end of each of the connecting units opposite to the first end being formed into an angled portion for locating between the support member and the locating member, and a plurality of clamping elements being arranged on each of the angled portions corresponding to the through holes on the locating member; a plurality of holding-down members, each of which including a curved pressing portion downward extended through the engaging hole formed on the top of the sleeve portion of the connecting unit to abut against an inner surface of the sleeve portion, and a wing portion outward extended from a middle section of each of two straight edges of the curved pressing portion, and the wing portions being rested on an outer surface of the sleeve portion along two opposite edges of the engaging hole; and a plurality of connectors provided on one side of the enclosure to separately connect to the clamping elements arranged on the second end of the connecting units.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
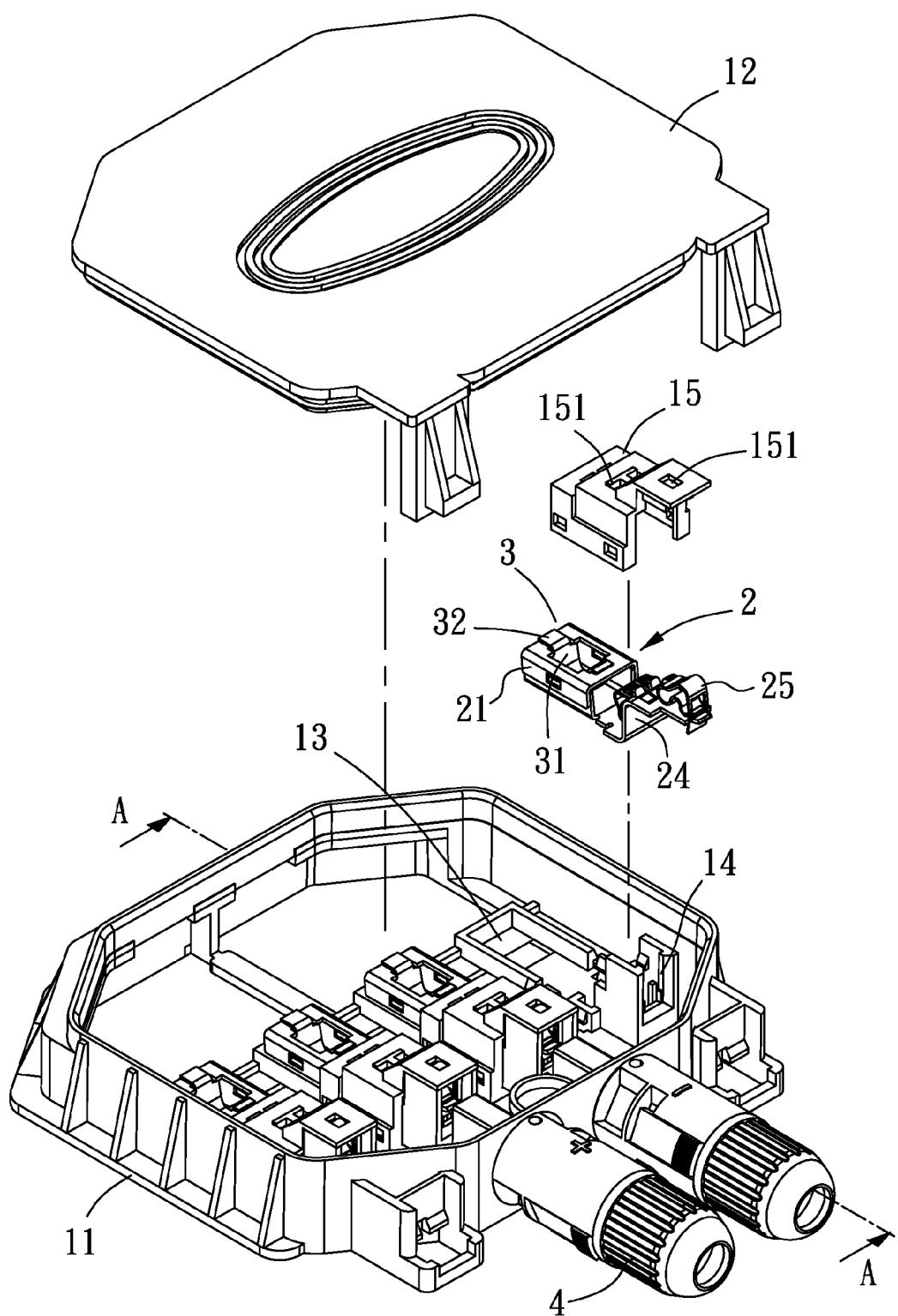
FIG. 1 is an exploded perspective view of a connecting device for solar panel according to a preferred embodiment of the present invention.
Figure 2:
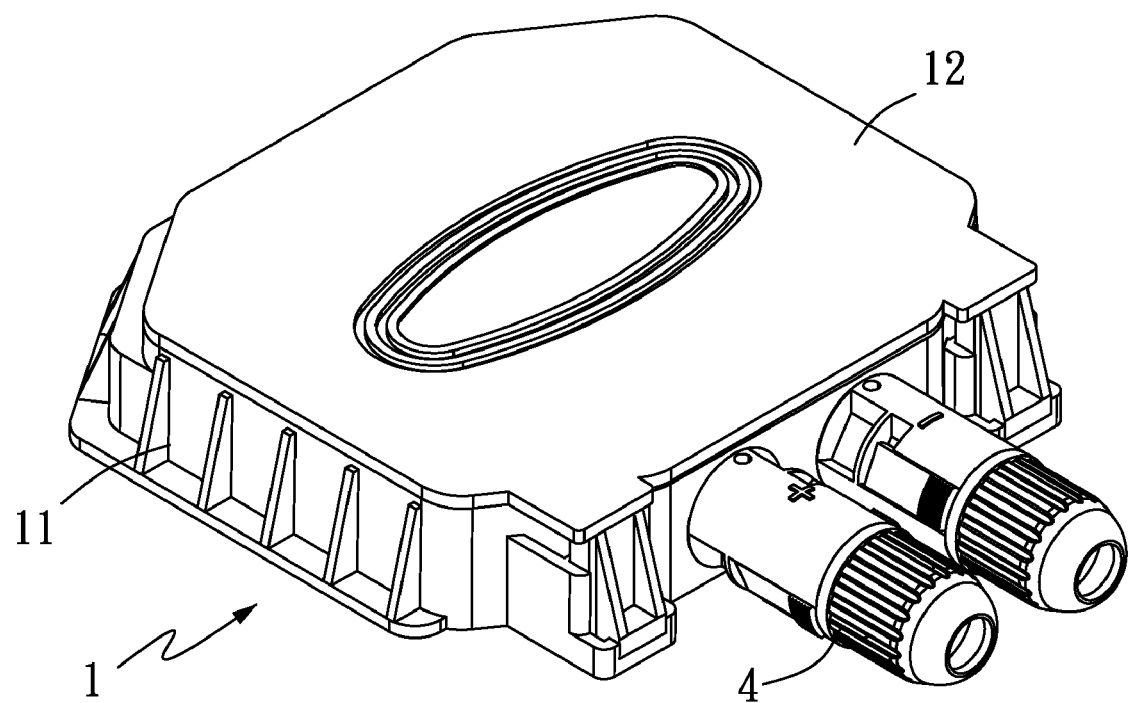
FIG. 2 is an assembled view of FIG. 1.
Figure 3:
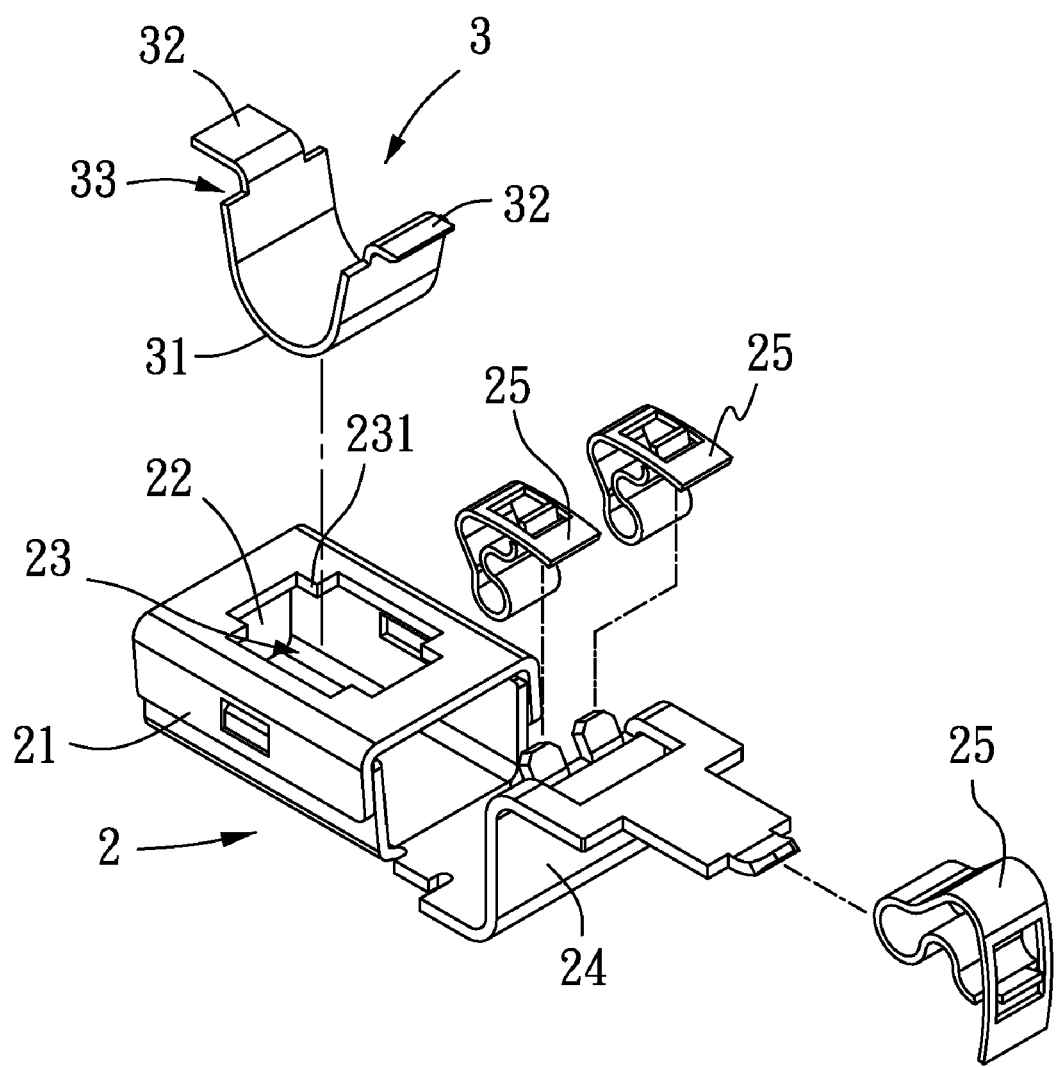
FIG. 3 is an exploded perspective view showing a connecting unit and a holding-down member included in the present invention.

Please refer to FIGS. 1 and 2 that are exploded and assembled perspective views, respectively, of a connecting device for solar panel according to a preferred embodiment of the present invention, and to FIG. 3 that is an exploded perspective view showing a connecting unit and a holding-down member included in the present invention. As shown, the connecting device for solar panel according to the present invention at least includes an enclosure 1, a plurality of connecting units 2, a plurality of holding-down members 3, and a plurality of connectors 4.

The enclosure 1 at least includes a seat 11 and a cover 12 closed to a top of the seat 11. A plurality of holding members 13 are arranged side by side on an inner surface of the seat 11. A support member 14 is provided at one end of each of the holding members 13. A locating member 15 is connected to each of the support members 14. Each of the locating members 15 is provided at predetermined positions with a through hole 151 each.

Each of the connecting units 2 has a first end formed into a sleeve portion 21 for locating on the holding member 13. At least an end surface and a top surface of the sleeve portion 21 are formed with an opening 22 and an engaging hole 23, respectively. Four corners in the engaging hole 23 are formed of an inward projection 231 each. A second end of the connecting unit 2 opposite to the first end is formed into an angled portion 24 for locating between the support member 14 and the locating member 15. A plurality of clamping elements 25 are arranged on the angled portion 24 corresponding to the through holes 151 on the locating member 15.

Each of the holding-down members 3 includes a curved pressing portion 31 adapted to downward extend through the engaging hole 23 to abut against an inner surface of the sleeve portion 21, and a wing portion 32 outward extended from a middle section of each of two straight edges of the curved pressing portion 31, such that two recesses 33 are separately formed at two lateral sides of the wing portion 32 between the wing portion 32 and the curved pressing portion 31. When the curved pressing portion 31 is downward extended through the engaging hole 23, the wing portions 32 are rested on an outer surface of the sleeve portion 21 along two opposite edges of the engaging hole 23 while the inward projections 231 at the four corners of the engaging hole 23 are separately snugly fitted in the recesses 33.

The connectors 4 are provided on one side of the enclosure 1 to connect to the clamping elements 25 arranged on the second end of the connecting units 2. Each of the connectors 4 has a terminal 41.

Figure 4:
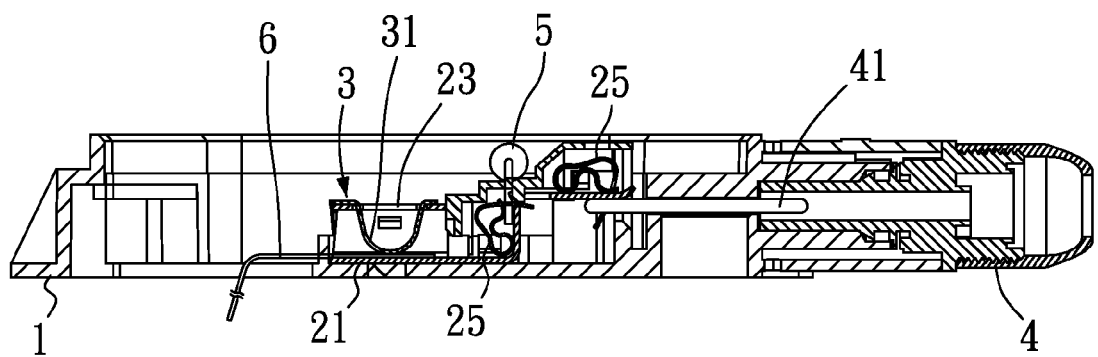
FIG. 4 is a sectional view taken along line A-A of FIG. 1.

FIG. 4 is a sectional view taken along line A-A of FIG. 1. Please refer to FIG. 4 along with FIGS. 1 and 3. To use the connecting device, first insert the terminals 41 of the connectors 4 into the clamping elements 25 at the second ends of two of the connecting units 2. In addition, the clamping elements 25 located on a top of the connecting units 2 are provided with a required diode 5 each. Thereafter, external conductors 6 extended from solar panels (not shown) are directly inserted into the sleeve portions 21 via the openings 22 formed at an end surface thereof, such that the external conductors 6 each are clamped between the curved pressing portions 31 of the holding-down members 3 and the inner surfaces of the sleeve portions 21. Since the curved pressing portions 31 of the holding-down members 3 downward extended through the engaging holes 23 each are resiliently bent to produce an elastic force and accordingly a downward pressure against the inner surface of the sleeve portions 21 when the wing portions 32 are rested on the outer surface of the sleeve portions 21 and the recesses 33 are abutted against inner edges of the projections 231, the external conductors 6 clamped between the curved pressing portions 31 and the inner surfaces of the sleeve portions 21 are firmly held thereto by the elastic force and downward pressure from the curved pressing portions 31 without the risk of loosening from the connecting units 2. Therefore, good electric transmission performance of the connecting device can be ensured.

In the connecting device for solar panel according to the present invention, due to the firm contact of the sleeve portion with the curved pressing portion of the holding-down member, the external conductors from the solar panels can be secured to the connecting units without the risk of becoming loosened therefrom, so that the electric transmission performance of the connecting device for solar panel can be ensured to effectively overcome the drawbacks in the conventional connecting box for solar panel. Therefore, the present invention is improved and more practical for use to meet the users' requirements.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A connecting device for solar panel, comprising:
    an enclosure having a plurality of holding members arranged side by side on an inner surface thereof, a support member being provided at one end of each of the holding members, and a locating member being connected to each of the support members; and each of the locating members being provided at predetermined positions with a through hole each;
    a plurality of connecting units each being formed at a first end into a sleeve portion for locating on the holding member, the sleeve portions each being formed on at least an end surface and a top surface with an opening and an engaging hole, respectively; a second end of each of the connecting units opposite to the first end being formed into an angled portion for locating between the support member and the locating member; and a plurality of clamping elements being arranged on each of the angled portions corresponding to the through holes on the locating member;
    a plurality of holding-down members, each of which including a curved pressing portion downward extended through the engaging hole formed on the top of the sleeve portion of the connecting unit to abut against an inner surface of the sleeve portion, and a wing portion outward extended from a middle section of each of two straight edges of the curved pressing portion; and the wing portions being rested on an outer surface of the sleeve portion along two opposite edges of the engaging hole; and
    a plurality of connectors provided on one side of the enclosure to separately connect to the clamping elements arranged on the second end of the connecting units.

2. The connecting device for solar panel as claimed in claim 1, wherein the enclosure at least includes a seat and a cover closed to a top of the seat.

3. The connecting device for solar panel as claimed in claim 1, wherein the engaging hole on each of the sleeve portions is formed at four corners with an inward projection each.

4. The connecting device for solar panel as claimed in claim 1, wherein each of the holding-down members includes two recesses separately formed at two lateral sides of each of the wing portions between the curved pressing portion and the wing portion.

\* \* \* \* \*